Oct. 5, 1937.　　　　G. HUGGETT　　　　2,094,891
BROADCAST SEEDING ATTACHMENT FOR TRACTORS
Filed Oct. 23, 1935　　　2 Sheets—Sheet 1
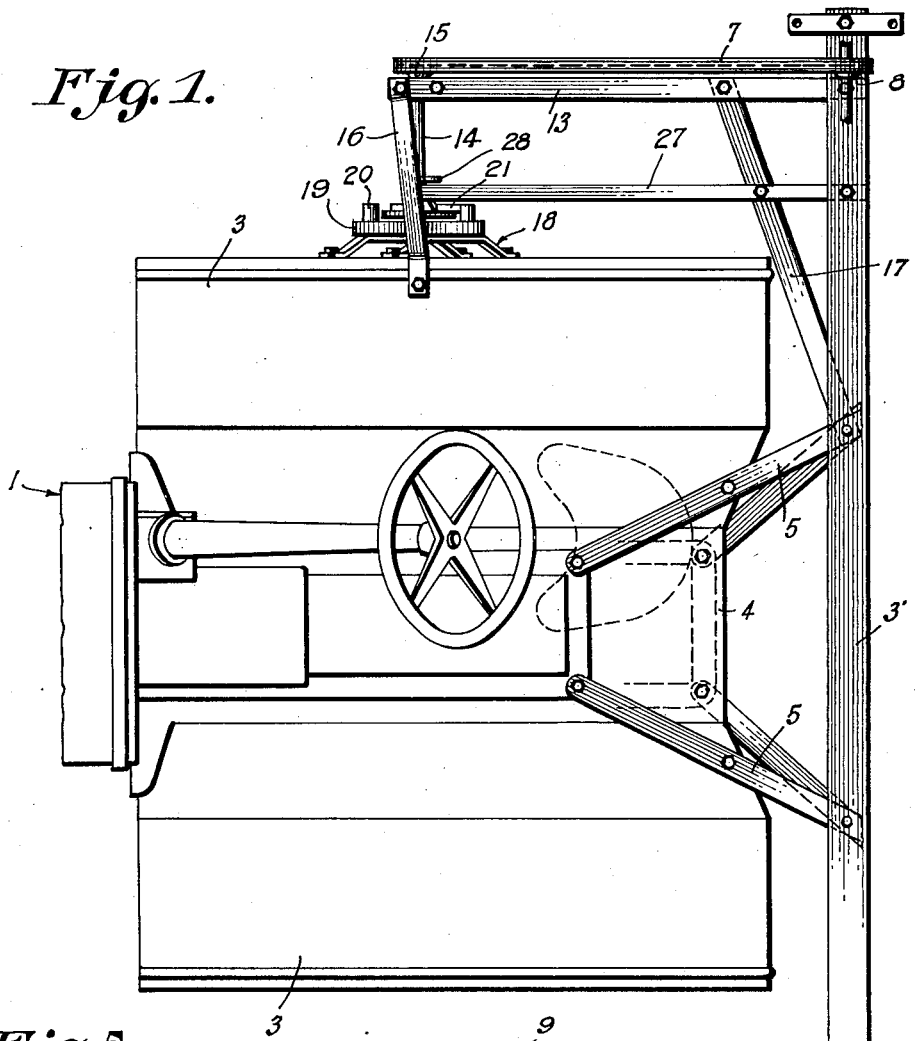
Fig. 1.
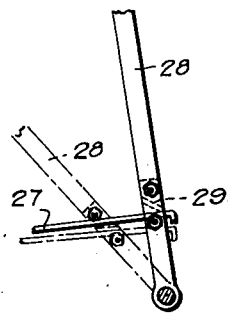
Fig. 5.
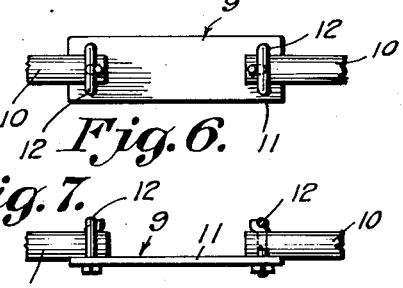
Fig. 6.
Fig. 7.
Gerald Huggett,
INVENTOR
BY *Victor J. Evans & Co.*
ATTORNEY Oct. 5, 1937.   G. HUGGETT   2,094,891
BROADCAST SEEDING ATTACHMENT FOR TRACTORS
Filed Oct. 23, 1935   2 Sheets-Sheet 2
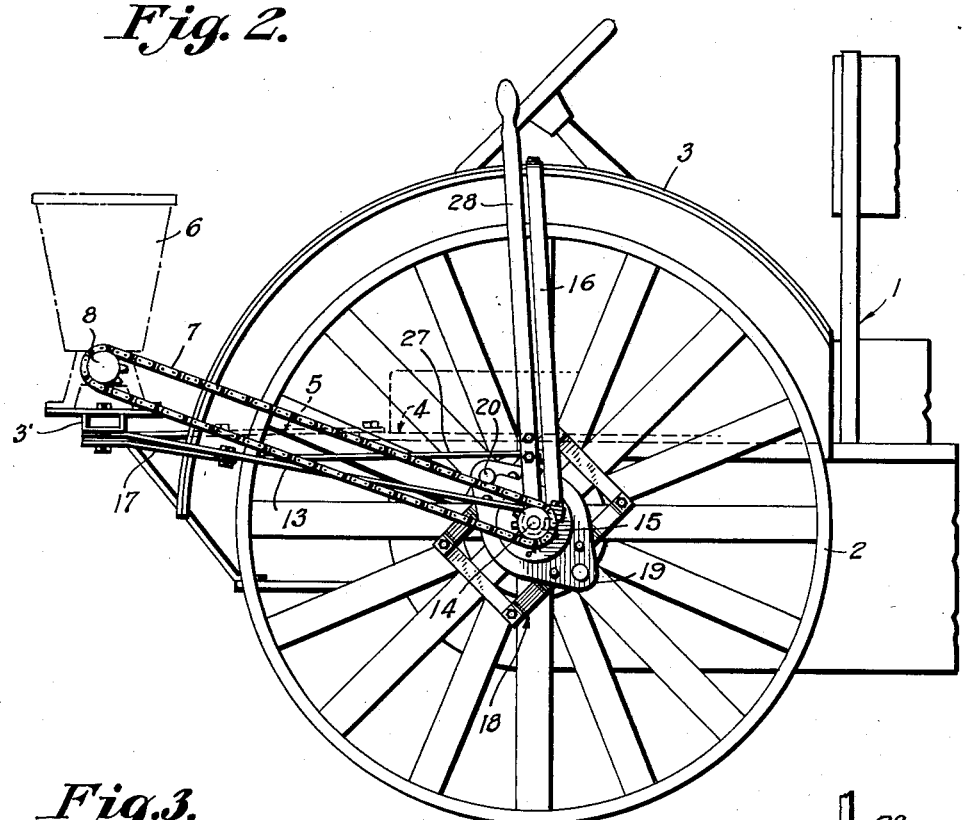
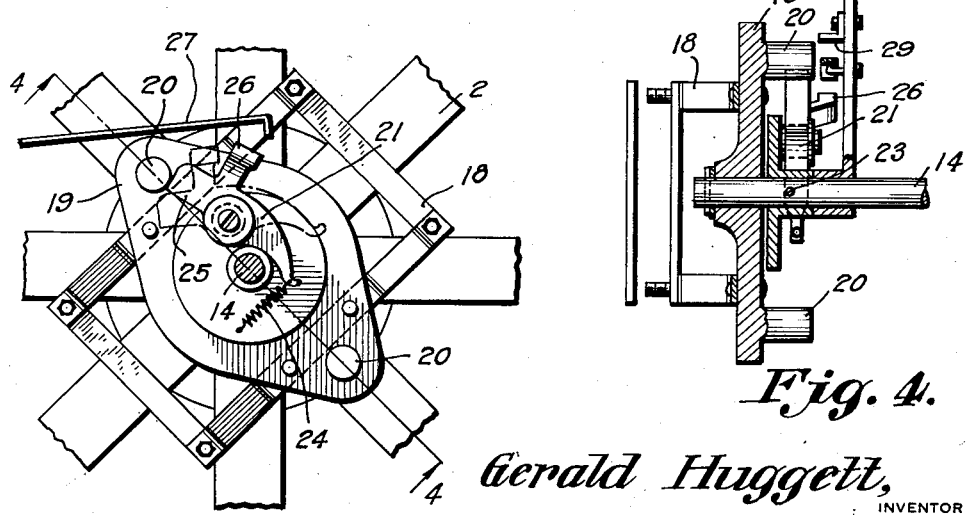
Gerald Huggett, INVENTOR
BY Victor J. Evans & Co.
ATTORNEY Patented Oct. 5, 1937

2,094,891

UNITED STATES PATENT OFFICE 2,094,891

BROADCAST SEEDING ATTACHMENT FOR TRACTORS

Gerald Huggett, St. Olaf Township, Otter Tail County, Minn.

Application October 23, 1935, Serial No. 46,399

1 Claim. (Cl. 74—15)

This invention relates to a broadcast seeding attachment for a tractor of any type, and has for the primary object the provision of a device of this character which may be easily adapted to a tractor and driven from one of the drive or traction wheels thereof to assure seeding of a given area of ground with a determined amount of seeds regardless of the tractor being operated in high, intermediate or low gear and which permits seeding, harrowing and covering operations to be successfully carried out during one operation by the tractor.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary top plan view showing my invention adapted to a tractor.

Figure 2 is a fragmentary side elevation illustrating the same.

Figure 3 is a fragmentary side elevation illustrating a combined clutch mechanism and drive for the seeder to one of the tractor wheels.

Figure 4 is a sectional view taken on the line 4—4 of Figure 3.

Figure 5 is a fragmentary view partly in section showing a control lever and its different positions.

Figure 6 is a plan view showing a coupler employed between a pair of seeders.

Figure 7 is a fragmentary edge view showing the same.

Referring in detail to the drawings, the numeral 1 indicates a fragmentary portion of a conventional type of tractor wherein one of the drive or traction wheels is shown at 2, with a fender 3 overlying said wheel. Arranged at the rear and extending transversely of the tractor 1 is a supporting beam 3 connected to the platform 4 of the tractor 1 by braces 5. The beam 3 supports one or more seeders 6 of a conventional construction wherein the operating or power translating shaft is connected to a sprocket chain 7 by a sprocket gear 8. As shown in Figures 6 and 7, a coupler 9 may be employed for connecting the operating shafts 10 of a pair of seeders so that one operating shaft of one seeder may turn the operating shaft of the other seeder, the coupler consisting of a plate 11 connected to the operating shafts by clamps 12.

Extending forwardly of the bar 3 and suitably connected thereto is a supporting bar 13 having journaled thereto a shaft 14 equipped with a sprocket gear 15 over which the sprocket chain 7 is trained. The supporting bar 13 supports the shaft 14 in alignment with the hub of the wheel 2. The forward end of the bar 13 is supported by a brace 16 which is connected to the fender 3. A brace 17 is arranged between the bar 13 and the bar 3.

A frame 18 is suitably secured to certain spokes of the wheel 2 so that said frame will be disposed adjacent to the hub. The frame 18 rotates with the wheel 2 and has secured thereto a plate 19 forming a journal for one end of the shaft 14. The plate 19 has formed thereon oppositely arranged drive lugs 20, either of which may engage a drive dog 21, the latter being pivoted to a plate 22 keyed to the shaft 14, as shown at 23. One end of the dog is connected to a coil spring 24 acting to position the end 25 of the dog in the path of movement of the lugs 20. An extension 26 is formed on the dog and is arranged out of the path of movement of the drive lugs 20 and may be engaged and disengaged by a catch member 27, the latter being of a resilient construction and secured to the bar 3 and brace 17. Normally, the catch member 27 disengages itself from the extension 26 so that the end 25 of the dog will be in the path of movement of either of the drive lugs 20 by the action of the spring 24 so as to establish a drive between the shaft 14 and the hub of the wheel.

A control lever 28 is journaled on the shaft 14 and is capable of occupying either of the positions shown in Figure 5 and has secured thereto an ear 29 riding against the catch member 27 so that when said lever is positioned, as shown in dotted lines in Figure 5, the catch member 27 will be forced downwardly to engage with the extension 26 and rock the dog 21 on its pivot, moving the end 25 thereof out of the path of either of the drive lugs, thereby interrupting the driving connection between the hub of the wheel and the shaft 14. The control lever when positioned as shown in full lines in Figure 5 permits the catch member 27 to rise and become disengaged from the extension 26 and thereby free the dog so that its end 25 may move into the path of movement of either of the drive lugs by the action of the spring 24 and thereby when engaged by either lug will establish the drive between the hub of the wheel and the shaft 14.

A tractor equipped with a seeder or seeders as described and driven by one of the traction wheels will permit a determined amount of seeds to be planted to a given area, regardless of the operation of the tractor in either low, intermediate or high gear. Also the seeder or seeders adapted to a tractor permits the latter to pull the usual harrow and drag so that the seeding, harrowing and covering operations may be successfully accomplished in one operation by the tractor.

Having described the invention, I claim:

A power takeoff attachment for tractors comprising a supporting structure, a power translating shaft mounted on said structure, a shaft journalled in said structure and arranged in alignment with a hub of a tractor wheel, means connecting the last mentioned shaft to the power translating shaft, a frame positioned in front of the hub of the wheel and detachably secured to spokes of the wheel, a plate journaled on the shaft and secured to the frame, spaced drive lugs secured to the plate, a second plate secured to the shaft, a spring influenced dog pivoted on the second plate and normally occupying a position in the path of movement of said lugs to be engaged by either of said lugs for establishing a drive between the wheel and the shaft, a resilient catch carried by the supporting structure, an extension formed on the dog to be engaged by the catch to move said dog out of the path of the lugs, and means for flexing said catch to engage and disengage the latter from the extension.

GERALD HUGGETT.